US012753897B2

(12) United States Patent
Jezersek

(10) Patent No.: US 12,753,897 B2
(45) Date of Patent: Oct. 6, 2026

(54) LIGHT MODULE AND LIGHTING DEVICE FOR A MOTOR VEHICLE

(71) Applicant: HELLA SATURNUS SLOVENIJA d.o.o., Ljubljana (SI)

(72) Inventor: Nejc Jezersek, Domzale (SI)

(73) Assignee: HELLA SATURNUS SLOVENIJA d.o.o., Ljubljana (SI)

( * ) Notice: Subject to any disclaimer, the term of this patent is extended or adjusted under 35 U.S.C. 154(b) by 0 days.

(21) Appl. No.: 19/427,336

(22) Filed: Dec. 19, 2025

(65) Prior Publication Data

US 2026/0110413 A1 Apr. 23, 2026

Related U.S. Application Data

(63) Continuation of application No. PCT/EP2023/067866, filed on Jun. 29, 2023.

(51) Int. Cl.
*F21S 41/32* (2018.01)
*F21S 41/147* (2018.01)
(Continued)

(52) U.S. Cl.
CPC .......... *F21S 41/321* (2018.01); *F21S 41/148* (2018.01); *F21S 41/25* (2018.01); *F21S 41/147* (2018.01);
(Continued)

(58) Field of Classification Search
CPC ......... F21W 2102/135; F21W 2102/14; F21W 2102/145; F21W 2102/15;
(Continued)

(56) References Cited

U.S. PATENT DOCUMENTS 11,022,266 B2 * 6/2021 Hermitte ............... F21S 41/148
11,280,464 B2 3/2022 Giraud
(Continued)

FOREIGN PATENT DOCUMENTS

EP 2597360 A1 5/2013
EP 2910847 A2 8/2015
(Continued)

OTHER PUBLICATIONS

The International Search Report for International Application No. PCT/EP2023/067866, dated Jan. 23, 2024, 2 pages.

*Primary Examiner* — Colin J Cattanach
(74) *Attorney, Agent, or Firm* — WARNER NORCROSS + JUDD LLP

(57) ABSTRACT

A light module is provided. The light module includes: a light source capable of emitting light rays around a main emission direction; and a reflector with a concave reflective surface configured to collect and reflect the light rays emitted by the light source into a light beam along an optical axis of the light module. The reflector includes: a front edge running perpendicular to the optical axis; a lateral edge running perpendicular to the main emission direction; and a horizontal edge featuring two segments running in distant planes substantially parallel to both the main emission direction and the optical axis, said segments being connected by a kink segment. The invention further includes an optical system configured to project the light beam and to form an image of the reflective surface of the reflector.

10 Claims, 7 Drawing Sheets

(51) Int. Cl.

| | |
|---|---|
| ***F21S 41/148*** | (2018.01) |
| ***F21S 41/25*** | (2018.01) |
| ***F21S 41/30*** | (2018.01) |
| ***F21W 102/135*** | (2018.01) |
| ***F21W 102/14*** | (2018.01) |
| ***F21W 102/145*** | (2018.01) |
| ***F21W 102/15*** | (2018.01) |
| ***F21W 102/155*** | (2018.01) |
| ***F21W 102/16*** | (2018.01) |
| ***F21W 102/165*** | (2018.01) |
| ***F21Y 115/10*** | (2016.01) |

(52) U.S. Cl.

CPC ................ *F21S 41/30* (2018.01); *F21S 41/32* (2018.01); *F21S 41/323* (2018.01); *F21W 2102/135* (2018.01); *F21W 2102/14* (2018.01); *F21W 2102/145* (2018.01); *F21W 2102/15* (2018.01); *F21W 2102/155* (2018.01); *F21W 2102/16* (2018.01); *F21W 2102/165* (2018.01); *F21Y 2115/10* (2016.08)

(58) Field of Classification Search

CPC ......... F21W 2102/155; F21W 2102/16; F21W 2102/165; F21S 41/147; F21S 41/148; F21S 41/143; F21S 41/145; F21S 41/30; F21S 41/32; F21S 41/321; F21S 41/323

See application file for complete search history.

(56) References Cited

U.S. PATENT DOCUMENTS

| | | | | |
|---|---|---|---|---|
| 12,117,139 | B2 * | 10/2024 | Debaine ................ | F21S 41/323 |
| 12,281,770 | B2 * | 4/2025 | Giraud .................. | F21S 41/148 |
| 2015/0023045 | A1 * | 1/2015 | Bauer ..................... | F21S 41/26<br>362/538 |

FOREIGN PATENT DOCUMENTS

| | | | |
|---|---|---|---|
| WO | 2013138834 | A1 | 9/2013 |
| WO | 2020025171 | A1 | 2/2020 |

* cited by examiner

LIGHT MODULE AND LIGHTING DEVICE FOR A MOTOR VEHICLE

CROSS-REFERENCE TO RELATED APPLICATIONS

The present application is a continuation of PCT/EP2023/067866, filed Jun. 29, 2023, the disclosure of which is incorporated by reference in its entirety.

FIELD OF THE INVENTION

The present invention relates to a light module and a related lighting device for a motor vehicle, especially a headlight.

BACKGROUND OF THE INVENTION

The document U.S. Pat. No. 11,280,464 B2 discloses a concept for a light module based on a reflector forming a light beam by collecting and reflecting the light emitted from a light source positioned in a focal point of the reflector and a subsequent optical projection system configured to project said light beam, i.e., to project an image of the reflective surface of the reflector. The reflector features the form of a circular or elliptical half-paraboloid covering the upper half space above the light source in the mounting position of the light module. The front edge of the reflector with respect to the general direction of propagation of the light beam delimits the lower portion of the projected image, and the rear edge of the reflector being the edge closest to the light source delimits the upper portion of the projected image. When the light module is used to form the low beam function of a motor vehicle headlight, the rear edge of the reflector thus essentially determines the detailed course of the cut-off line of the light distribution projected onto the street in front of the motor vehicle.

A disadvantage of this concept is the very short distance between the light source and the rear edge of the reflector shaping the cut-off line, since even slight deviations of the position of the light source from a nominal position lead to strong changes in the light intensity distribution around the cut-off line. Furthermore, the spatial arrangement of the light source below the reflector in the mounting position of the light module requires the printed-circuit board (PCB) supplying the light source to be positioned horizontally below the light source. Such positioning leads to difficult thermal management of the light module, as the air heated by the operation of the light source accumulates in the space enclosed between the PCB and the concave reflector and cannot be effectively dissipated.

SUMMARY OF THE INVENTION

It is an object of the present invention to propose a light module based on the above concept, that avoids the aforementioned disadvantages of the prior art.

This object is achieved by a light module and a related lighting device as taught by the present disclosure.

The invention discloses a light module, in particular for a motor vehicle headlight, comprising: a light source capable of emitting light rays around a main emission direction, said main emission direction being oriented substantially horizontally in a mounting position of the light module; and a reflector with a concave reflective surface configured to collect and reflect the light rays emitted by the light source into a light beam along an optical axis of the light module, said optical axis being oriented substantially horizontally in a mounting position of the light module. The reflector includes: a front edge running for the most part in a plane substantially perpendicular to the optical axis; a lateral edge running for the most part in a plane substantially perpendicular to the main emission direction; and a horizontal edge featuring two segments running for the most part in distant planes substantially parallel to both the main emission direction and the optical axis, said segments being connected by a kink segment. The invention further comprises an optical system configured to project the light beam and to form an image of the reflective surface of the reflector, wherein said front edge delimits a lower portion of the light image formed and said horizontal edge delimits an upper portion of the light image forming a kinked horizontal cut-off line.

The basic idea of the invention is to reduce the solid angle covered by the reflector, which allows greater freedom in positioning the light source and the supplying PCB relative to the reflector. The horizontal edge of the reflector, which determines the cut-off line of the light image projected by the optical system, is adapted accordingly and features a kinked course extending from the rearmost section of the reflector to the front edge. The light source is oriented to emit light rays around a main emission direction that is substantially horizontal in the mounting position of the light module, i.e., in the position and orientation which the light module occupies in intended use, in particular when used in a lighting device of a motor vehicle. Accordingly, the PCB that is positioned on the backside of the light source takes up an upright position, which is more convenient and more efficient for the dissipation of operational heat from the light source compared to the case of a horizontal PCB orientation. Such a positioning of the light source relative to the horizontal edge of the reflector allows a larger distance between the light source and the kink segment of the horizontal edge compared to the aforementioned prior art concept. Therefore, the light intensity incident on the kink segment, and in turn the light intensity distribution around the cut-off line in the light image projected by the optical system, is less susceptible to position variations of the light source. Manufacturing and assembly tolerances thus affect the performance of the light module to a lower extent.

With regard to the directions and orientations indicated herein, it is known to the person skilled in the art that the indications given there also include moderate and expedient deviations, approximately in the order of several degrees, for example up to 10°. For instance, the lateral edge of the reflector does not have to run exactly and completely in a vertically aligned plane perpendicular to the main emission direction of the light source. Rather, the plane in question may have a tilting deviating by few degrees, or the lateral edge may run in sections in different planes that have a slight tilting to each other. It is only necessary to ensure that the light source together with the PCB can be placed in an essentially vertical position next to the lateral edge and can fully illuminate the concave reflective surface of the reflector.

In particular, the main emission direction of the light source forms an angle with the optical axis in the range of 45° to 135°, preferably 80° to 110°. When defining this angular range, the optical axis is considered as a vector pointing from the reflector to the optical system.

Preferably, the front edge of the reflector sweeps an angular range about an axis parallel to the optical axis through a focal point of the reflector of 70° to 110°, especially 80° to 100°. The front edge is the edge of the reflector that is closest to the optical system. The solid angle covered by the reflector is thus considerably smaller than with typical reflectors from the prior art, which accounts for the greater freedom in positioning the light source.

In preferred embodiments of the light module the reflective surface of the reflector represents a segment of a paraboloid, in particular a circular paraboloid, or a segment of an ellipsoid or a free-form shape, wherein the light source is positioned in or close to the focal point of said paraboloid, ellipsoid or free-form. An axis of symmetry of the paraboloid or ellipsoid is oriented parallel or identical to the optical axis of the light module, such that positioning the light source in the focal point causes all light rays emitted by the light source to be reflected by the reflector into a light beam that is substantially parallel to the optical axis.

In particular, the reflector is configured and positioned relative to the light source so that the light rays reflected from its reflective surface are parallel to the optical axis or have an angle of inclination with respect to the optical axis smaller than or equal to 25°, preferably smaller than or equal to 10°. For example, positioning the light source slightly below the focal point of a parabolic reflector leads to a tilt of the reflected light beam relative to the optical axis.

These paraxial optical conditions allow a large distance along the optical axis between the front edge of the reflector and the optical system, preferably in the range of 5 mm to 200 mm, preferably 30 mm to 50 mm. This has the technical advantage that manufacturing and assembly-related tolerances with regard to the relative positioning of the reflector and the optical system are only reflected to a very minor extent in the quality of the optical projection.

In a preferred embodiment, the optical system features a projection lens. Under paraxial optical conditions, the aberrations of optical systems are small, so that the projection lens can in particular be designed as a thin lens, i.e., a lens with a thickness (distance along the optical axis between the two surfaces of the lens) that is negligible compared to the radii of curvature of the lens surfaces.

In particular, the kink segment in the horizontal edge of the reflector is positioned in the focal plane of the optical system in order to generate a sharp cut-off line in the projected light image.

The invention furthermore relates to a lighting device for a motor vehicle, in particular a headlight, comprising at least one light module according to one of the previous embodiments, wherein in a mounting position of the lighting device the main emission direction of the light source and the optical axis are oriented substantially horizontally. In particular, the lighting device is designed as a headlight with the light module being configured to generate a low beam function. The light image projected onto the road ahead of the corresponding motor vehicle exhibits a kinked cut-off line with a low cut-off line in the part of the light image that is directed towards the centre of the road and a higher cut-off line at the border of the light image. For instance, the lighting device according to the invention may only be responsible for generating a portion of the low beam light distribution comprising the kinked cut-off line segment, and additional lighting devices are combined therewith to generate the remainder portions of the entire low beam.

BRIEF DESCRIPTION OF THE DRAWINGS

Additional details, characteristics and advantages of the object of the invention are disclosed in the following description of the respective figures-which in an exemplary and schematic fashion-show preferred embodiments of the invention.

DETAILED DESCRIPTION OF THE CURRENT EMBODIMENT

Figure 1:
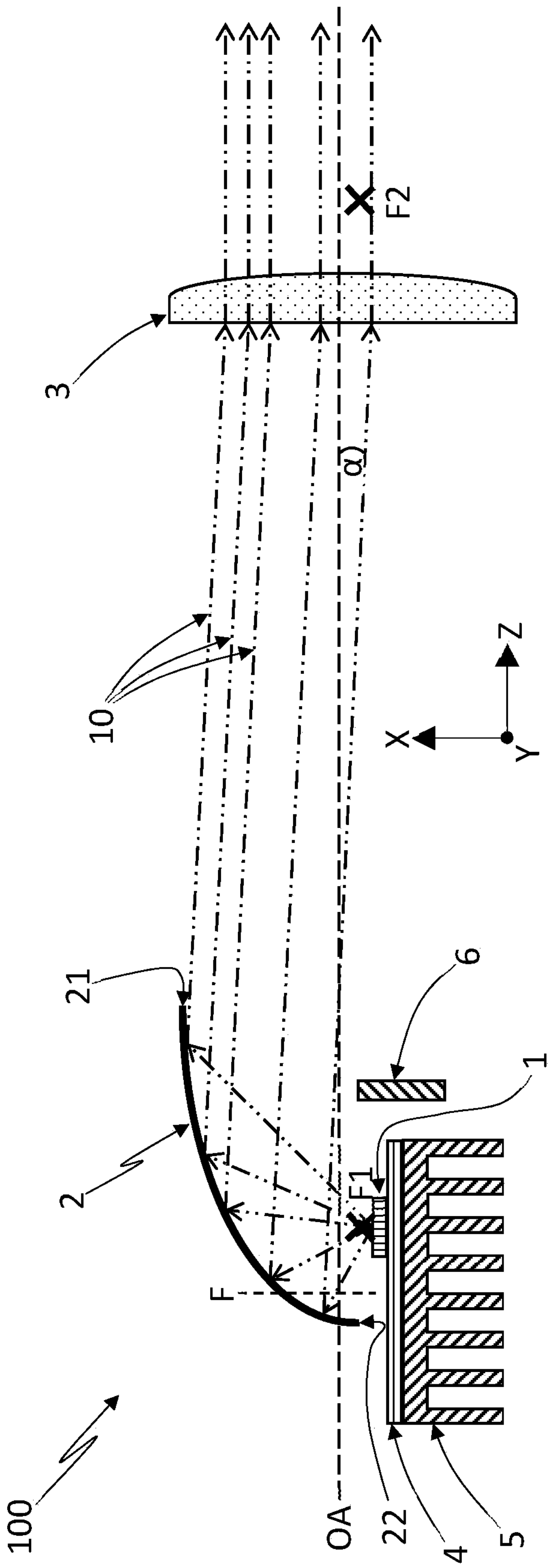
FIG. 1 shows a cross-section of a light module.
Figure 2A:
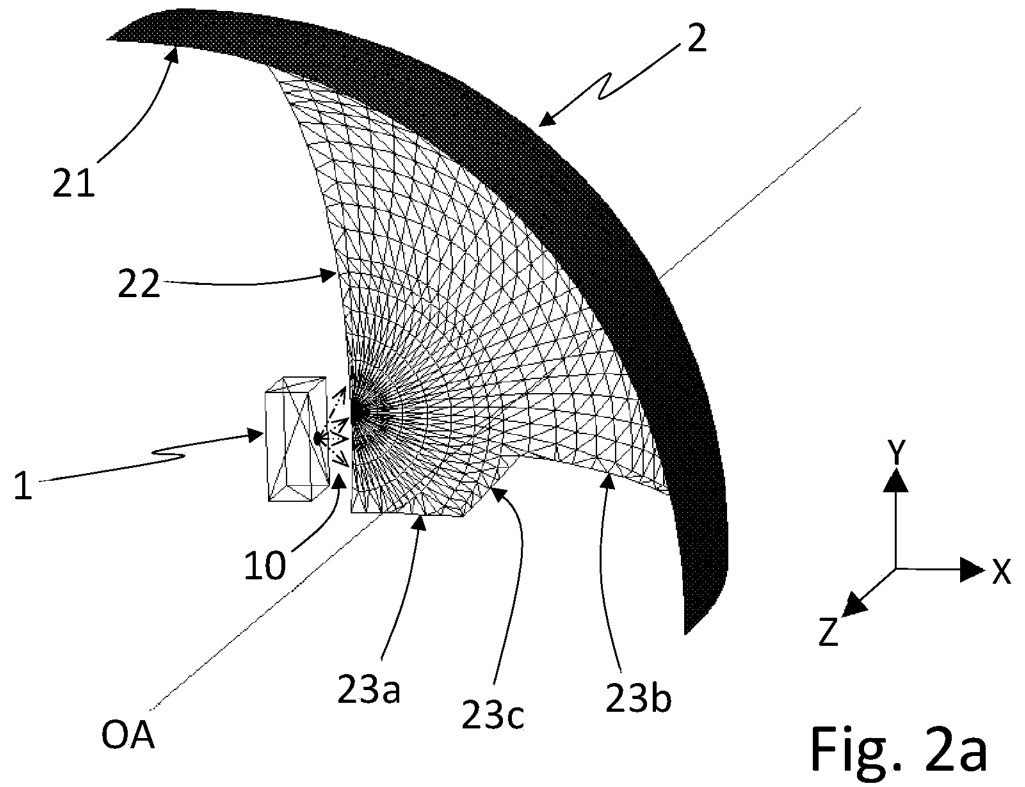
FIGS. 2*a*-2*c* show perspective views of components of a first embodiment of a light module for a headlight.
Figure 2B:
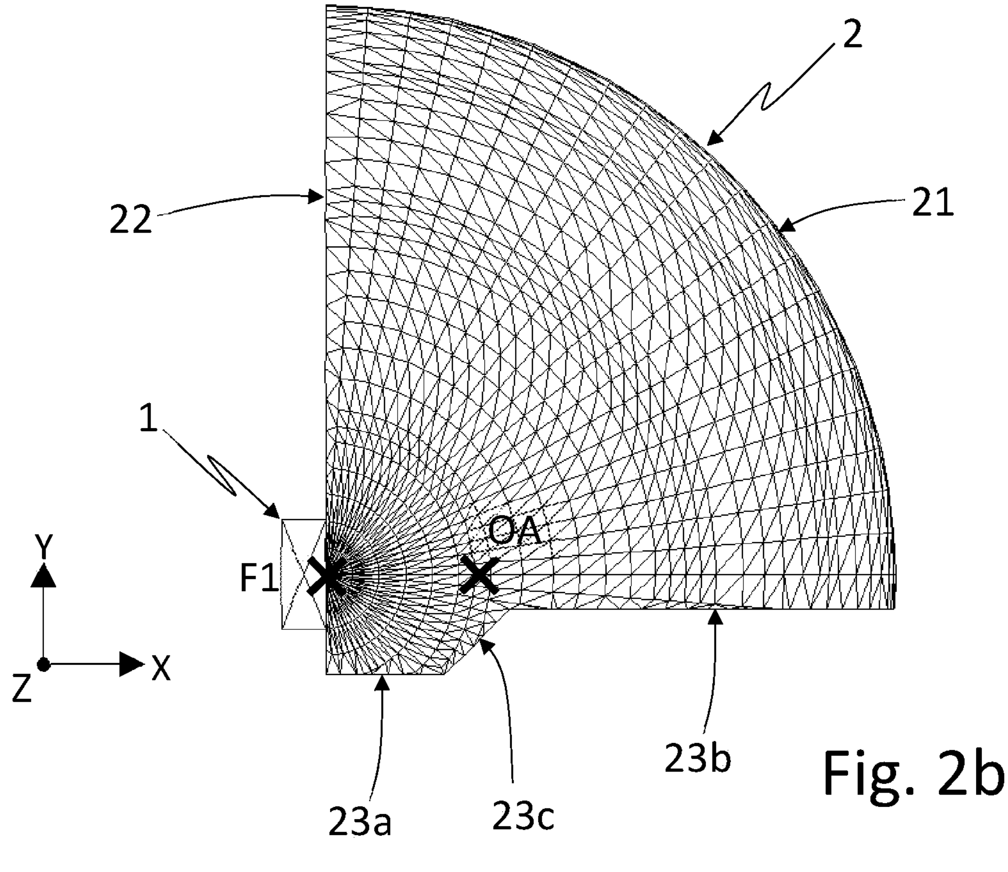
Figure 2C:
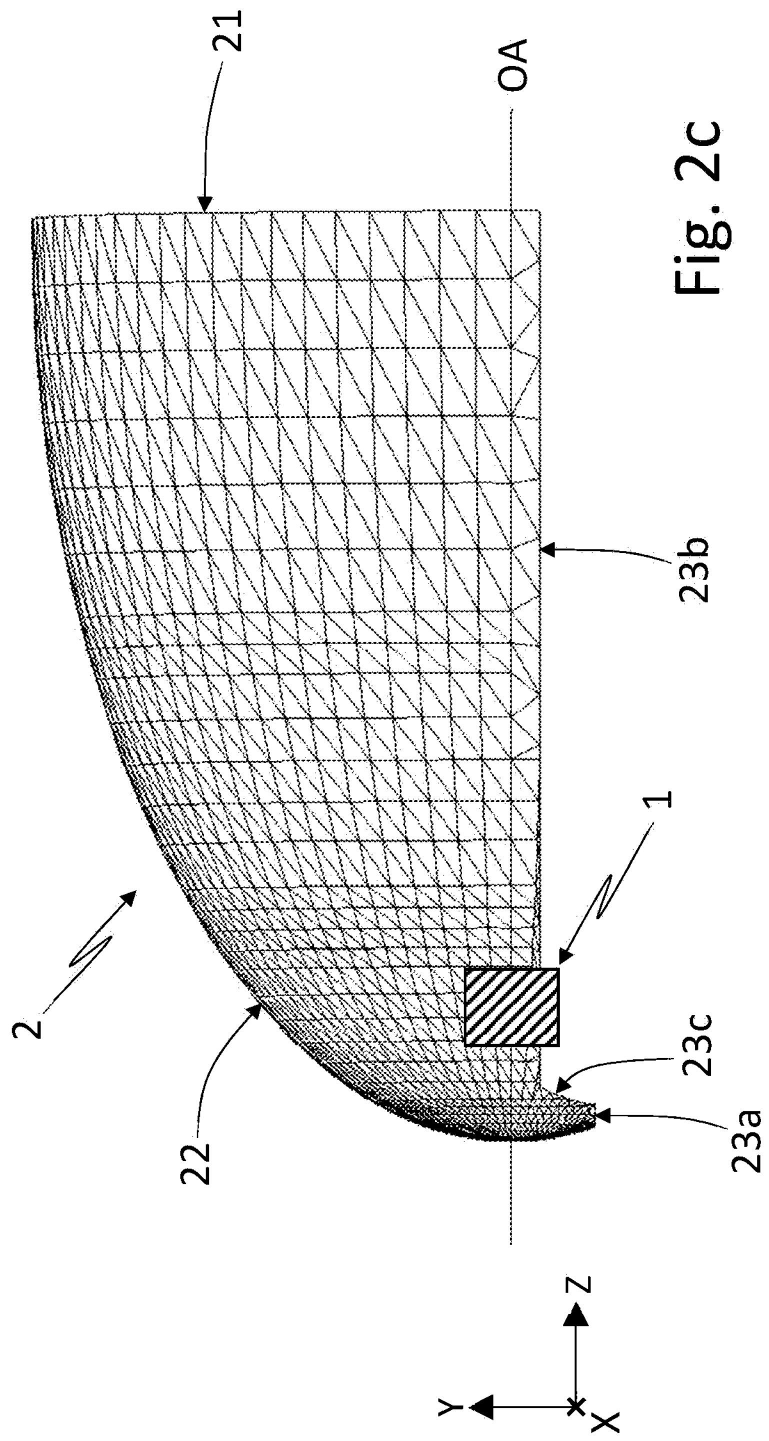
Figure 3A:
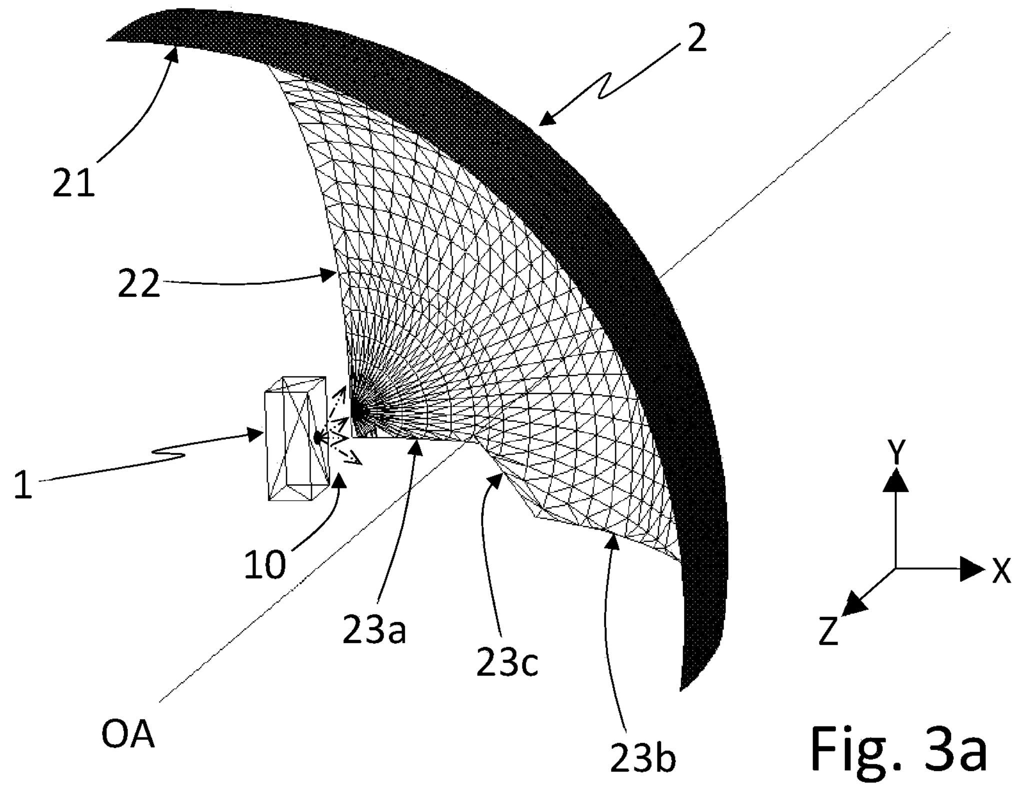
FIGS. 3*a*-3*c* show perspective views of components of a second embodiment.
Figure 3B:
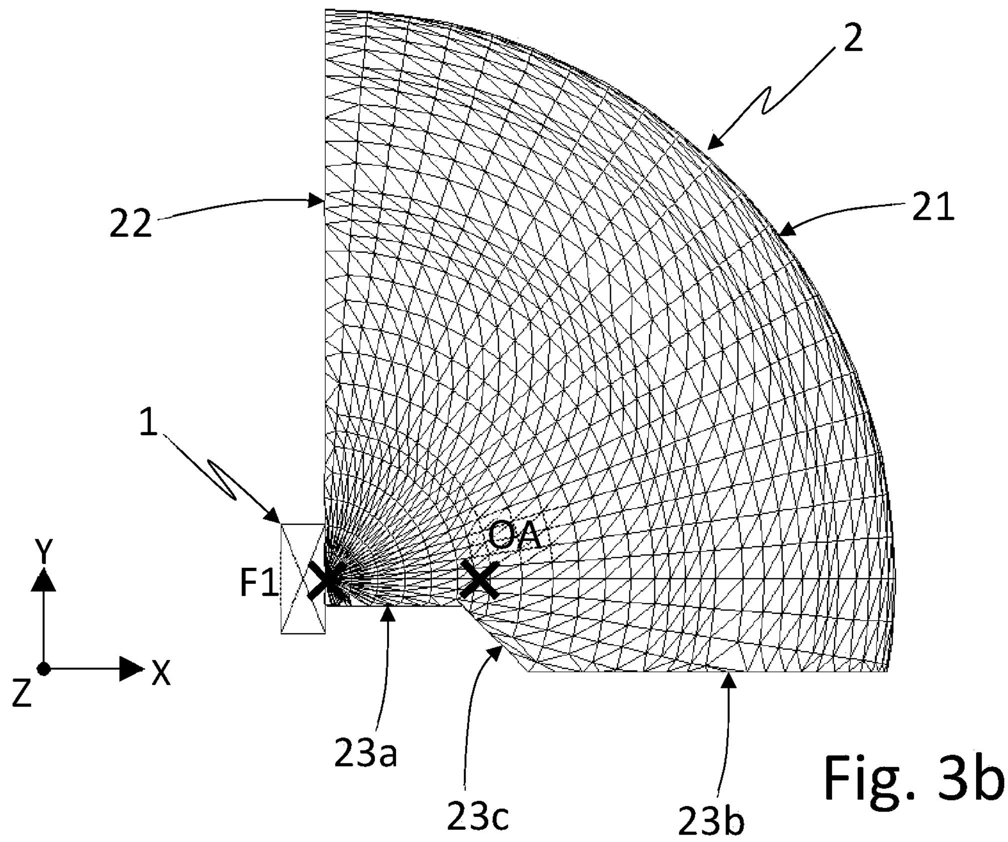
Figure 3C:
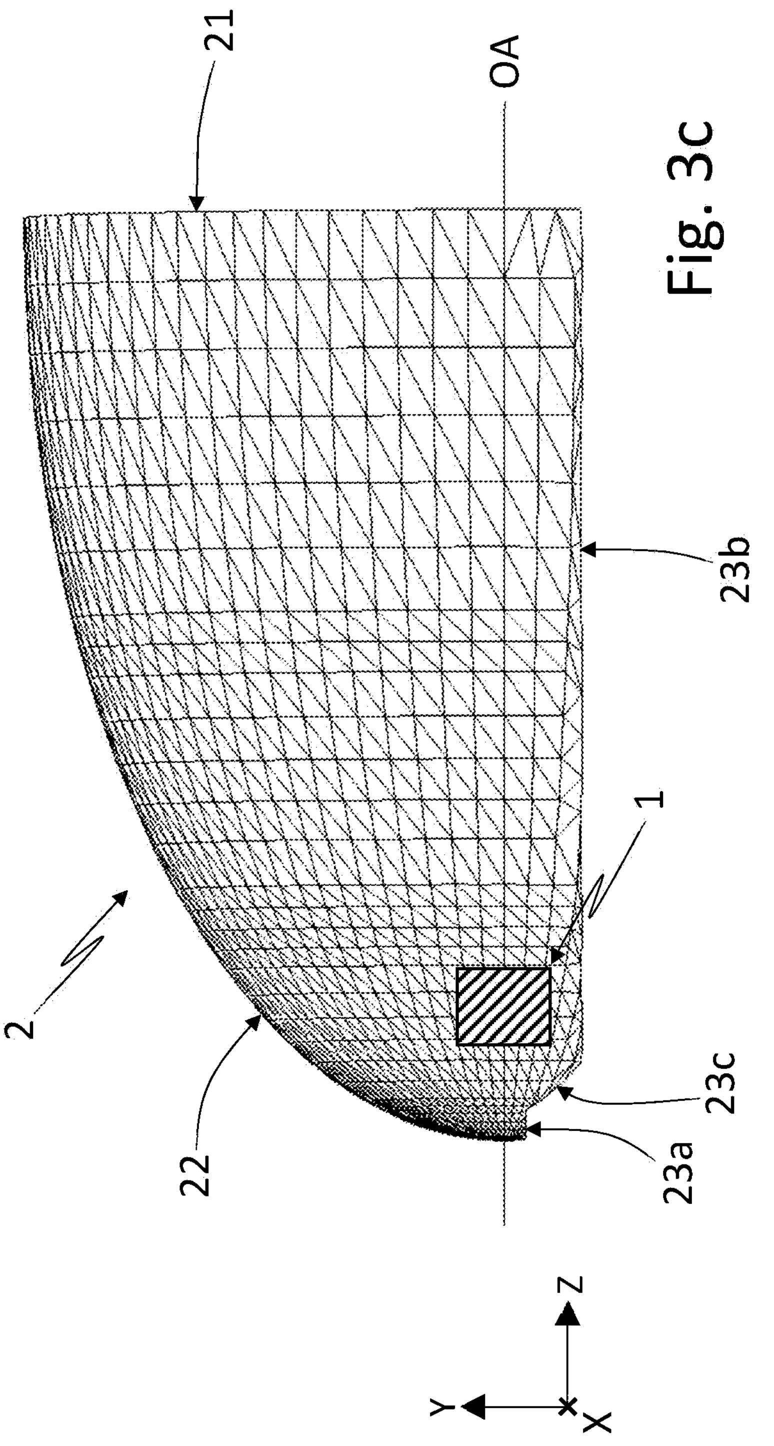
Figure 4:
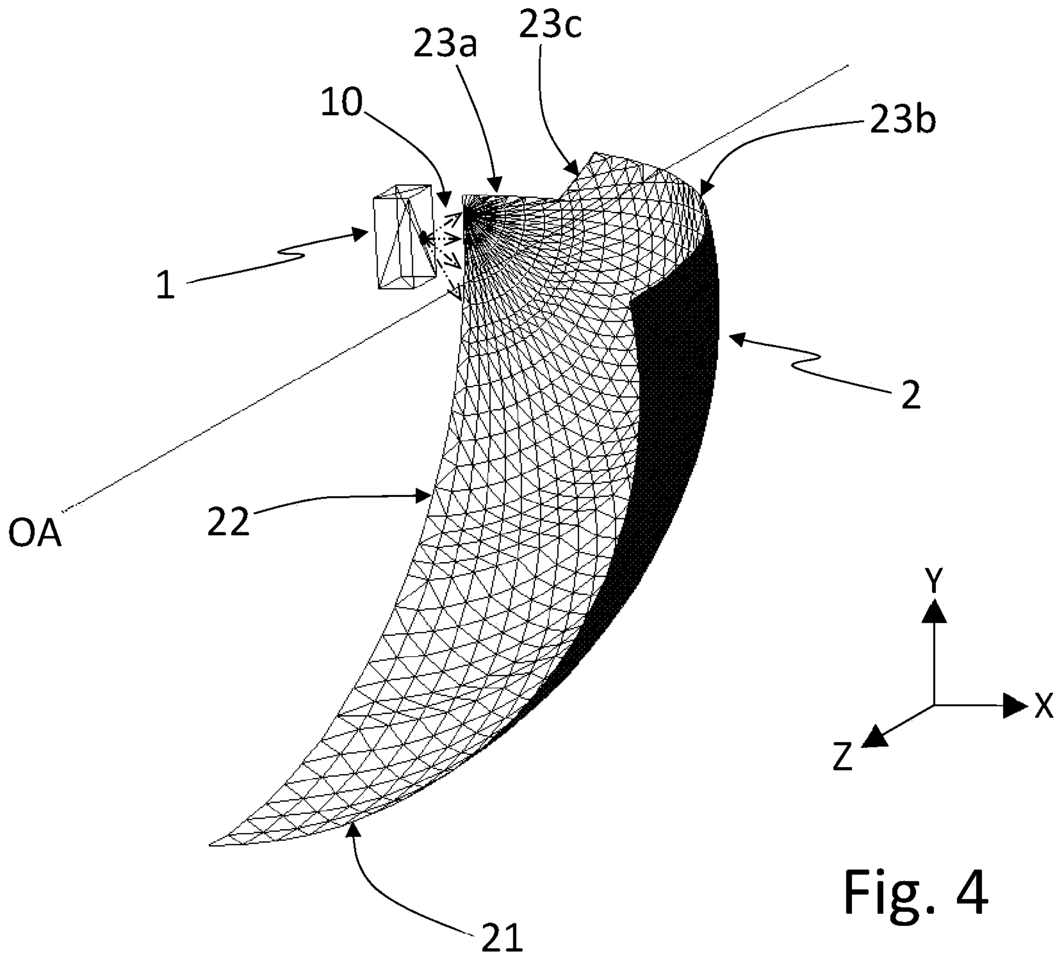
FIG. 4 shows a perspective view of components of a third embodiment.
Figure 5:
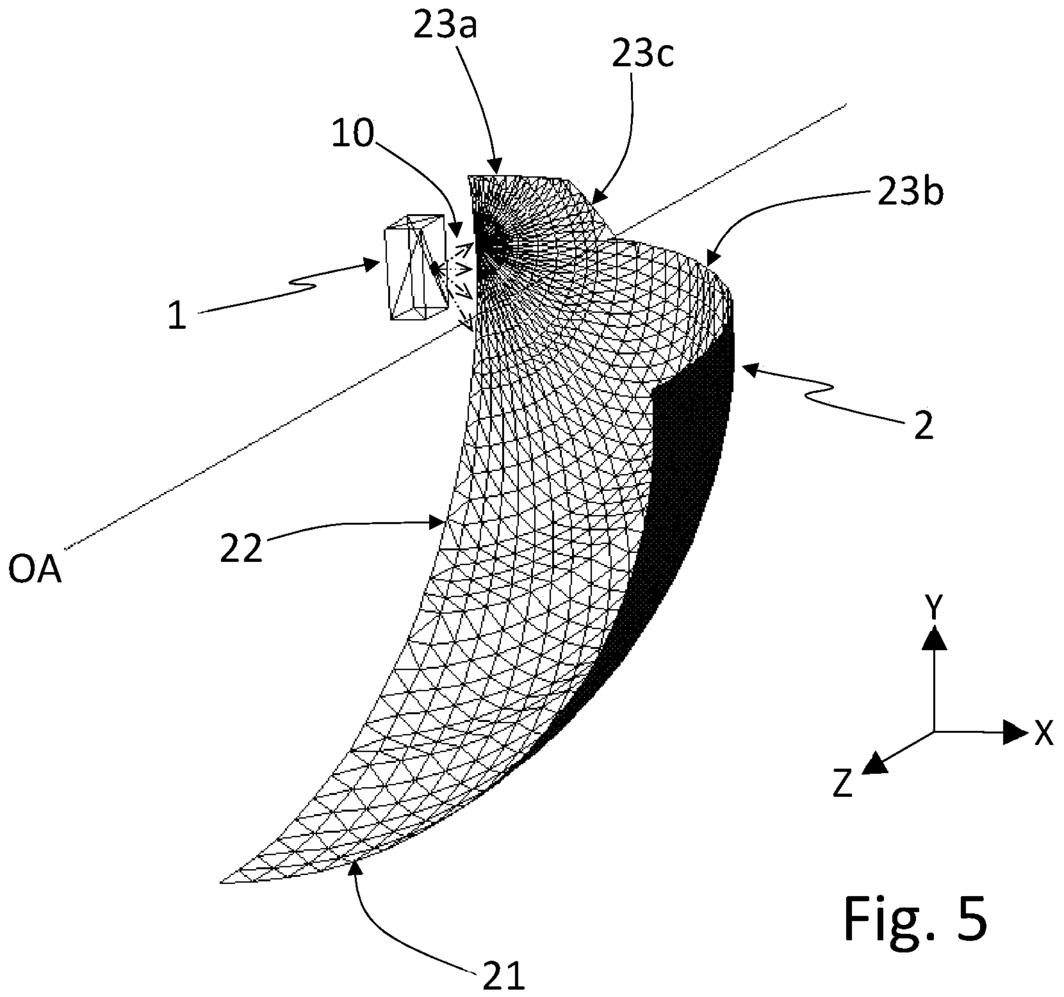
FIG. 5 shows a perspective view of components of a fourth embodiment.

FIG. 1 shows a cross-section along the optical axis OA of a light module 100 according to the invention. In the intended mounting position of the light module 100 the spatial directions X and Z span a horizontal plane and the spatial direction Y is oriented vertically. The light module 100 comprises the light source 1, the reflector 2 and the optical system 3 in form of a thin projection lens. The optical axis OA is oriented along Z and the main emission direction of the light source 1 corresponds to X.

The light source 1 is preferably designed as a high-power light-emitting diode (LED) or an array of LEDs. The light source 1 emits light rays 10 in a cone around the main emission direction X. The light source 1 is supplied via the PCB 4, which is mounted on the heat sink body 5.

The concave reflective surface of the reflector 2 represents a segment of a prolate ellipsoid and is configured to collect and reflect the light rays 10 emitted by the light source 1 into a light beam along the optical axis OA. The symmetry axis of said ellipsoid is slightly spaced apart and parallel to the optical axis OA. The first focal point F1 of the ellipsoid lays just above the light source 1 and the second focal point F2 lays behind the optical system 3. This configuration leads to an angle of inclination a of the light beam reflected by the reflector 2 with respect to the optical axis OA smaller than 25°.

The projection lens forming the optical system 3 is configured to project the light beam and to form an image of the reflective surface of the reflector 2, wherein the front edge 21 of the reflector 2 delimits the lower portion of the light image formed and the horizontal edge (not visible in the cross-section of FIG. 1) delimits an upper portion of the light image forming a kinked horizontal cut-off line. The kink segment in the horizontal edge of the reflector 2 is positioned in the focal plane F of the optical system 3, i.e., the kink segment intersects the focal plane F. The optional shield 6 prevents light rays from undesirably reaching the area above the cut-off line.

FIGS. 2*a*-2*c*, FIGS. 3*a*-3*c*, FIG. 4 and FIG. 5 show perspective views of the reflector 2 and the light source 1 of four embodiments of the light module according to the invention for use as low beam modules in motor vehicle headlights, namely for right-hand headlights (FIGS. 2*a*-2*c*, FIG. 4) and for left-hand headlights (FIGS. 3*a*-3*c*, FIG. 5). In the intended mounting position of the light module 100 the spatial directions X and Z span a horizontal plane and the spatial direction Y is oriented vertically. The horizontal edge of the reflector 2 given by the segments 23*a*-23*c* may represent the geodetically lowest (FIGS. 2*a*-2*c*, FIGS. 3*a*-3*c*) or highest boundary (FIG. 4, FIG. 5) of the reflector 2, wherein the optical system has to be configured accordingly in each case, such that in the projected image the upper portion is delimited by a kinked horizontal cut-off line corresponding to the horizontal edge of the reflector 2.

Each reflector 2 features: the front edge 21 running in a plane perpendicular to the optical axis OA; the lateral edge 22 running in a plane perpendicular to the main emission direction X of the light source 1; and the horizontal edge featuring two horizontal segments 23*a*, 23*b* running in distant planes parallel to both the main emission direction X and the optical axis OA, said horizontal segments 23*a*, 23*b* being connected by the kink segment 23*c*.

The horizontal edge thus features two kinks at the intersects of the horizontal segments 23*a*, 23*b* with the kink segment 23*c*. The orientation of the kink segment 23*c* is determined in each case by the intended use in right-hand or left-hand headlights.

The concave reflective surface of the reflector 2 represents a segment of an ellipsoid, wherein the light source 1 is positioned in the focal point F1 of said ellipsoid. The front edge 21 of the reflector 2 sweeps an angular range of approx. 93° about a symmetry axis of said ellipsoid parallel to the optical axis OA through the focal point F1.

The present invention is not limited by the embodiments described above, which are represented as examples only and can be modified in various ways within the scope of protection defined by the appending patent claims.

List of reference signs:

| | |
|---|---|
| 100 | light module |
| 1 | light source |
| 10 | light ray |
| 2 | reflector |
| 21 | front edge |
| 22 | lateral edge |
| 23a, 23b | horizontal segment |
| 23c | kink segment |
| 3 | optical system |
| 4 | PCB |
| 5 | heat sink body |
| 6 | shield |
| F | focal plane of the optical system |
| F1 | first focal point of the reflector |
| F2 | second focal point of the reflector |
| OA | optical axis |
| X, Y, Z | spatial direction |
| α | inclination angle |

The above description is that of a current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A light module for a motor vehicle headlight, comprising:

a light source capable of emitting light rays around a main emission direction, said main emission direction being oriented horizontally in a mounting position of the light module;

a reflector with a concave reflective surface configured to collect and reflect the light rays emitted by the light source into a light beam along an optical axis of the light module, said optical axis being oriented horizontally in the mounting position of the light module, wherein the reflector includes:

a front edge running in a plane perpendicular to the optical axis, a lateral edge running in a plane perpendicular to the main emission direction, and a horizontal edge featuring two horizontal segments running in distant planes parallel to the main emission direction and the optical axis, said horizontal segments being connected by a kink segment; and an optical system that is configured to project the light beam and to form an image of the reflective surface of the reflector, wherein said front edge delimits a lower portion of the light image formed and said horizontal edge delimits an upper portion of the light image forming a kinked horizontal cut-off line.

2. The light module of claim 1, wherein the main emission direction forms an angle with the optical axis in the range of 45° to 135°.

3. The light module of claim 1, wherein the front edge of the reflector sweeps an angular range about an axis parallel to the optical axis through a focal point of the reflector of 70° to 110°.

4. The light module of claim 1, wherein the reflective surface of the reflector represents a segment of a paraboloid or an ellipsoid having a focal point, wherein the light source is positioned at the focal point of said paraboloid or said ellipsoid.

5. The light module of claim 1, wherein the reflector is configured and positioned relative to the light source so that the light rays reflected from the reflective surface are parallel to the optical axis or have an angle of inclination with respect to the optical axis smaller than or equal to 25°.

6. The light module of claim 1, wherein the kink segment of the reflector is positioned in a focal plane of the optical system.

7. The light module of claim 1, wherein a distance along the optical axis between the front edge of the reflector and the optical system is in the range of 5 mm to 200 mm.

8. The light module of claim 1, wherein the optical system comprises a projection lens.

9. A lighting device for a headlight, the lighting device comprising the light module of claim 1, wherein in a mounting position of the lighting device the main emission direction of the light source and the optical axis are oriented horizontally.

10. The lighting device of claim 9, wherein the light module is configured to generate a low beam function.

* * * * *